(12) United States Patent
Love et al.

(10) Patent No.: US 7,257,170 B2
(45) Date of Patent: Aug. 14, 2007

(54) CHANNEL NORM-BASED ORDERING AND WHITENED DECODING FOR MIMO COMMUNICATION SYSTEMS

(75) Inventors: David J. Love, Garland, TX (US); Srinath Hosur, Plano, TX (US); Anuj Batra, Dallas, TX (US); Tarik Muharemovic, Richardson, TX (US); Eko N. Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 611 days.

(21) Appl. No.: 10/644,489

(22) Filed: Aug. 20, 2003

(65) Prior Publication Data

US 2004/0085890 A1  May 6, 2004

Related U.S. Application Data

(60) Provisional application No. 60/404,860, filed on Aug. 21, 2002.

(51) Int. Cl.
*H03D 1/00* (2006.01)
*H04L 27/06* (2006.01)

(52) U.S. Cl. .................................................. 375/340
(58) Field of Classification Search ................. 375/224, 375/262, 285, 340, 341, 346
See application file for complete search history.

(56) References Cited

U.S. PATENT DOCUMENTS

| | | | |
|---|---|---|---|
| 5,809,043 A * | 9/1998 | Hassan et al. | 714/780 |
| 6,606,725 B1 * | 8/2003 | Wang et al. | 714/755 |
| 6,650,716 B1 * | 11/2003 | Ratnarajah | 375/347 |
| 6,707,864 B2 * | 3/2004 | Kim | 375/343 |
| 2002/0196842 A1 * | 12/2002 | Onggosanusi et al. | 375/148 |
| 2003/0026236 A1 * | 2/2003 | De et al. | 370/342 |
| 2003/0026345 A1 * | 2/2003 | Muharemovic et al. | 375/260 |
| 2004/0170229 A1 * | 9/2004 | Kim | 375/267 |
| 2004/0229567 A1 * | 11/2004 | Bilgic et al. | 455/63.1 |
| 2005/0243900 A1 * | 11/2005 | Pan et al. | 375/148 |
| 2006/0182070 A1 * | 8/2006 | Pan et al. | 370/335 |

* cited by examiner

*Primary Examiner*—Jean B. Corrielus
(74) *Attorney, Agent, or Firm*—Steven A. Shaw; W. James Brady; Frederick J. Telecky, Jr.

(57) ABSTRACT

A channel norm-based ordering and whitened decoding technique (lower complexity iterative decoder) for MIMO communication systems performs approximately the same level of performance as an iterative minimum mean squared error decoder. Decoding a signal vector comprises receiving a signal vector $y_k$, multiplying the received signal vector $y_k$ by a conjugate transpose of a channel matrix $H^*$. A column vector $z_k$ is generated. The entries of the column vector $z_k$ are reordered and an estimated channel matrix $\tilde{H}$ is generated. The estimated channel matrix $\tilde{H}$ decomposed using a Cholesky decomposition and generating a triangular matrix L. Triangular matrix L is solved backwards and a signal vector $\tilde{s}_k$ estimated. An estimate of the transmitted symbol vector $\hat{S}_k$ is generated.

3 Claims, 1 Drawing Sheet

CHANNEL NORM-BASED ORDERING AND WHITENED DECODING FOR MIMO COMMUNICATION SYSTEMS

RELATED APPLICATIONS

This application is related to provisional application serial No. 60/404,860, filed Aug. 21, 2002, by David J. Love, Srinath Hosur, Anuj Batra, Tarik Muharemovic and Eko N. Onggosanusi.

BACKGROUND OF THE INVENTION

1. Field of the Invention

This invention relates generally to multiple-input multiple-output (MIMO) communication systems. More particularly, this invention relates to channel norm-based ordering and whitened decoding for MIMO communication systems.

2. Description of the Prior Art

Multiple-input multiple-output (MIMO) communication systems provide gain in capacity and quality compared to single-input single-output (SISO) communication systems. While a SISO system employs one transmitter and one receiver to receive the transmitted signal, a MIMO system in general uses $M_t \geq 1$ transmitters and $M_r \geq 1$ receivers. Thus the SISO system is a special case of a MIMO system, with $M_t = M_r = 1$. Examples of MIMO systems include but are not limited to: 1. A communication system employing multiple-antennas at the transmitter and/or receiver; 2. A communication system employing orthogonal frequency division multiplexing (OFDM) or code division multiplexing (CDMA); 3. A time/frequency division multiple access system; 4. Any multiuser communication system; 5. Any combination of 1-4 above.

Typically, the MIMO systems consist of a MIMO transmitter that sends "multidimensional" symbol information. This multidimensional symbol could, but is not limited to, be represented by a vector (note that a matrix symbol can always be represented as a vector symbol by stacking the columns/rows of the matrix into a vector). The multidimensional symbol might represent one or more coded or uncoded data symbols corresponding to SISO transmitters. The transmitted signal propagates through the channel and is received and processed by a MIMO receiver. Note that the receiver could obtain multiple received signals corresponding to each transmitted symbol. The performance of the communication system hinges on the ability of the receiver to process and find reliable estimates of the transmitted symbol based on the received signals.

Definitions

As used herein, bolded capitol symbols, such as H, represent matrices.

As used herein, bolded lower-case symbols, such as s, represent vectors.

As used herein, $^T$ denotes matrix transposition.

As used herein, * denotes the matrix conjugate transpose operation.

As used herein, $^{-1}$ denotes the matrix inverse operation.

As used herein, if W is a matrix, $W_m$ denotes the mth column of W.

As used herein, if W is a matrix, $(W^T)_m$ denotes the mth row of W.

As used herein, if v is a vector, $\|v\|_2$ denotes the 2-norm of v.

As used herein, if Q(·) represents the symbol slicing function, it will be assumed to slice both single symbols and multi-dimensional symbol vectors.

As used herein, $I_M$ represents the M by M identity matrix.

As used herein, $0_{M \times N}$ represents the M by N matrix of zeros.

As used herein, if A and B are sets, then A|B is the set of all elements in A that are not in B.

For MIMO systems such as, but not limited to, the ones discussed herein above, the received signal can be written, after front end receive processing such as filtering, down-conversion, AGC, synchronization etc., in the form $$y_k = \sum_n H_n s_{k-n} + v \qquad (1)$$

where $H_n$ is an $M_r$ by $M_t$ matrix of complex gains, $s_k$ is the $M_t$-dimensional symbol vector transmitted at time k, and v is a $M_r$-dimensional vector of additive noise. In narrowband wireless systems where the symbol period is much larger than the RMS delay spread as well as in OFDM systems where the inter-symbol interference is negligible due to the insertion of a cyclic prefix and/or guard interval, the channel from each transmit antenna to each receive antenna (per frequency bin in case of OFDM) is often modeled as a single-tap complex gain. In this case equation (1) simplifies to $$y_k = Hs_k + v \qquad (2)$$

where H is now an $M_r$ by $M_t$ matrix of complex numbers and $Hs_k$ is the matrix product of H and $s_k$.

The receiver must estimate the symbol matrix $S=[s_1 \ldots s_T]$ in order to facilitate reliable communication. Examples, but by no means the only examples, of multidimensional symbols could be space-time codes where T>1 or spatial multiplexing systems with T=1 and independent SISO modulation on each transmit antenna. In case of no or negligible additive noise, v, and an invertible H, the estimation problem would reduce to that of inverting H. The presence of non-negligible noise, however, increases the difficulty in estimating S. Note that we have assumed that the receiver is has some estimate of H, that could be obtained by transmitting appropriate training sequences. The symbol matrix S is also assumed to be chosen from a finite set C of possible multidimensional symbols (this is typically the case as for e.g. where each element of S is chosen from a QAM symbol set).

The optimal solution in the sense of minimizing the probability of symbol error has been shown to be the maximum aposterior (MAP) decoder which in case of equiprobable symbol transmissions is equivalent to a maximum likelihood (ML) decoder. The ML decoder attempts to find S, the symbol matrix, by using the symbol matrix Ŝ that maximizes $p(\hat{S}|y_1, \ldots, y_T)$ where $p(\cdot|y_1, \ldots, y_{kT})$ is the conditional probability density function (pdf) of $s_k$ given $y_1, \ldots, y_T$. In real-time communications systems, however, this type of decoder is overly computationally complex. Decoders that search over a set V of possible multidimensional symbols S and decode to the multidimensional symbol Š in V that minimizes some sort of metric are denoted as minimum distance (MD) decoders. The MAP and ML decoders are MD decoders with V=C, where C is the set of all possible multidimensional symbols S.

Many algorithms that are computationally easier than ML decoding have been proposed in order to overcome the huge computational burden of ML decodings. Algorithms that perform some form of reduced complexity decoding will be referred to herein as sub-optimal decoders. An example of a suboptimal decoder is successive interference cancellation (SIC) method. A receiver using SIC decodes each symbol within the symbol vector one at a time. After each symbol is decoded, its approximate contribution to the received vector is subtracted in order to improve the estimate of the next symbol within the symbol vector. The order of symbol decoding and subtraction could be arbitrary or based on rules such as maximization of pre/post processing SNR etc.

An example of an SIC receiver is the ordered iterative minimum mean squared error (IMMSE) receiver. With a single-tap channel, the receive signal is given by equation (2) above. Letting $s_k=[s_1\ s_2\ \ldots\ s_{M_t}]^T$, the ordered IMMSE operates using the following steps, letting $y_{k,0}=y_k$, $D_0=\{1,2,\ldots,M_t\}$, and $H_k^{(0)}=H$.

1. Set m=0.
2. Compute $W^m=(H_k^{(m)*}H_k^{(m)}+pI_{M_t-m})^{-1}H_k^{(m)*}$.

3. Let $n = \underset{i \in D_0}{\mathrm{argmin}} \|(W^{(m)T})_i\|_2$.
4. Set $\tilde{s}_{k,n} = Q(y_{k,m}^T(W^{(m)T})_i)$.
5. Set $y_{k,m+1} = y_{k,m} - H_{k,n}^{(m)}\tilde{s}_{k,n}$, $D_{m+1} = D_m \setminus \{n\}$, and $$H_k^{(m+1)} = [H_{k,1}^{(m+1)} H_{k,2}^{(m+1)} \ldots H_{k,n-1}^{(m+1)} 0_{M_r \times 1} H_{k,n+1}^{(m+1)} \ldots H_{k,M_t}^{(m+1)}].$$

6. Repeat steps 1-5 for m<$M_t$.
7. Set the decoded symbol vector to $\tilde{s}_k=[\tilde{s}_{k,1}\ \tilde{s}_{k,2}\ \ldots\ \tilde{s}_{k,M_t}]^T$.

Regarding the above algorithm, it is important to note that $H_{k,i}^{(m+1)}$ denotes the ith row of the matrix $H_k^{(m+1)}$ (time k and iteration m+1). Another example among sub-optimal decoders is the zero-forcing decoder which decodes to the symbol $\tilde{s}_k=Q(H^{-1}y_k)$. This decoder is usually considered the worst performing and least complex of the sub-optimal decoders.

Sub-optimal techniques unfortunately differ in diversity order from ML decoding (i.e. the asymptotic slope of the average probability of bit error curve). They essentially trade reduced complexity for reduced performance.

In view of the foregoing, it is both advantageous and desirable to provide a lower complexity iterative decoder with channel norm based ordering that performs approximately the same as the iterative minimum mean squared error (IMMSE) decoder.

SUMMARY OF THE INVENTION

The present invention is directed to a channel norm-based ordering and whitened decoding technique (lower complexity iterative decoder) for MIMO communication systems and that performs approximately the same as the iterative minimum mean squared error decoder.

According to one embodiment, a method of decoding a signal vector comprises the steps of receiving a signal vector $y_k$; multiplying the received signal vector $y_k$ by a conjugate transpose of a channel matrix H* and generating a column vector $z_k$ therefrom; reordering entries associated with the column vector $z_k$ and generating an estimated channel matrix $\tilde{H}$ therefrom; decomposing the estimated channel matrix $\tilde{H}$ via Cholesky decomposition and generating a triangular matrix L therefrom; solving triangular matrix L backwards and estimating a signal vector $\tilde{s}_k$ therefrom, wherein $\tilde{s}_k$ is the true sorted symbol vector; and sorting signal vector $\tilde{s}_k$ and generating an estimate of the transmitted symbol vector $\tilde{s}_k$ therefrom.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
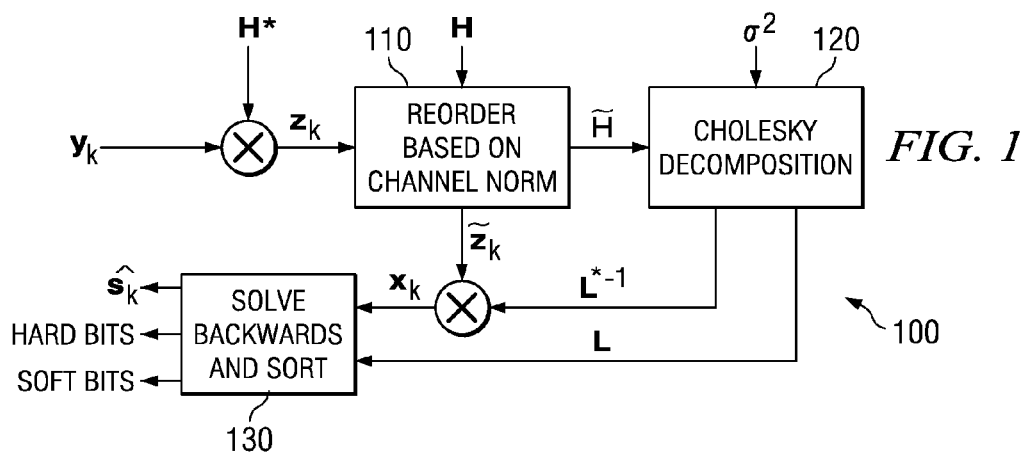
FIG. 1 is a system block diagram illustrating a decoder according to one embodiment of the present invention.

FIG. 1 is a system block diagram illustrating a decoding algorithm 100 according to one embodiment of the present invention. The decoding algorithm 100 was found by the present inventors to provide reduced complexity without much loss in performance when compared with known sub-optimal schemes based on iterative interference cancellation. In order to preserve clarity and brevity, and to better understand how decoding algorithm 100 functions, it will be assumed that each random entry in v is complex Gaussian with variance $\sigma^2$ and that the expected value of the transmit power on each antenna is constrained to be 1. A received symbol vector $y_k$ is multiplied by the conjugate transpose of the channel matrix yielding $$z_k = H^*Hs_k + H^*v. \quad (3)$$

The entries in the column vector $z_k$ are then reordered based on the column norms 110 of the channel. This is done by defining $$\tilde{z}_k = [z_{k,i_1}, z_{k,i_2}, \ldots, z_{k,i_{M_t}}]^T, \tilde{s}_k = [s_{k,i_1}, s_{k,i_2}, \ldots, s_{k,i_{M_t}}]^T \quad (4)$$

and $$\tilde{v}_k = [v_{k,i_1}, v_{k,i_2}, \ldots, v_{k,i_{M_t}}]^T, \text{ and } \tilde{H} = [H_{k,i_1}, H_{k,i_2}, \ldots, H_{k,i_{M_t}}] \quad (5)$$

where for m≤n, $\|H_{k,i_m}\|_2 \leq \|H_{k,i_n}\|_2$. At this point, a Cholesky decomposition 120 is taken such that $$L^*L = \tilde{H}^*\tilde{H} + \sigma^2 I_{M_t}. \quad (6)$$

Now multiplying $\tilde{z}_k$ by $L^{*-1}$ yields $$x_k = L^{*-1}(\tilde{H}^*\tilde{H}+\sigma^2 I_{M_t})\tilde{s}_k - L^{*-1}\sigma^2 I_{M_t}\tilde{s}_k + L^{*-1}\tilde{H}^*\tilde{v} = L\tilde{s}_k + L^{*-1}(\tilde{H}^*\tilde{v}-\sigma^2 I_{M_t}\tilde{s}_k) \qquad (7)$$

where $\tilde{s}_k$ is the true sorted symbol vector. The triangular matrix L is then used to solve backwards for $\tilde{s}_k$. After estimating $\tilde{s}_k$, the vector is then sorted into an estimate of the transmitted symbol vector $\hat{s}_k$. The decoding algorithm 100 returns this estimated vector along with the soft and hard decoded bits from Solve Backwards and Sort 130 as shown in FIG. 1.

It is important to note that the noise+interference term during the backwards substitution step, $L^{*-1}(\tilde{H}^*v-\sigma^2 I_{M_t}\tilde{s}_k)$, is zero mean with a covariance matrix of $\sigma^2 I_{M_t}$ under the assumption that the transmitters transmit each point in the constellation with equal probability. This is important if an outer code such as a convolutional code is used since it allows the Viterbi algorithm to be used as an optimal ML decoding scheme for the outer code. The IMMSE algorithm does not have this property.

The computational complexity of the decoding algorithm 100 shown in FIG. 1 is also lower than ordered IMMSE. This algorithm 100 requires ordering only once during the decoding. In contrast, the ordered IMMSE algorithm requires M, orderings while decoding a symbol vector. The algorithm 100 shown in FIG. 1 and discussed herein above, can be seen to also require a Cholesky decomposition and the inversion of a triangular matrix. In contrast, the ordered IMMSE algorithm requires M,−1 matrix inversions.

Figure 2:
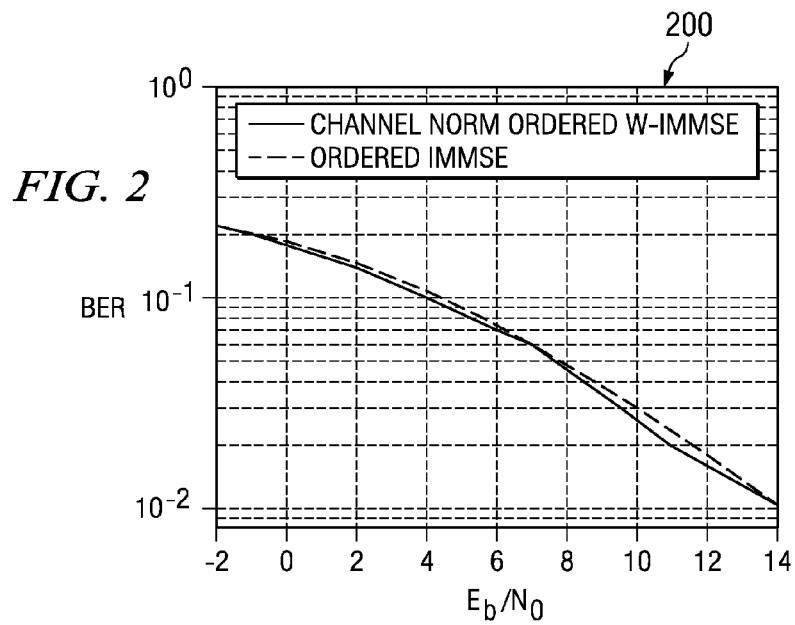
FIG. 2 is a graph depicting simulation results illustrating a comparison of the decoder shown in FIG. 1 with an ordered IMMSE for a 2×2 system using 16-QAM.
Figure 3:
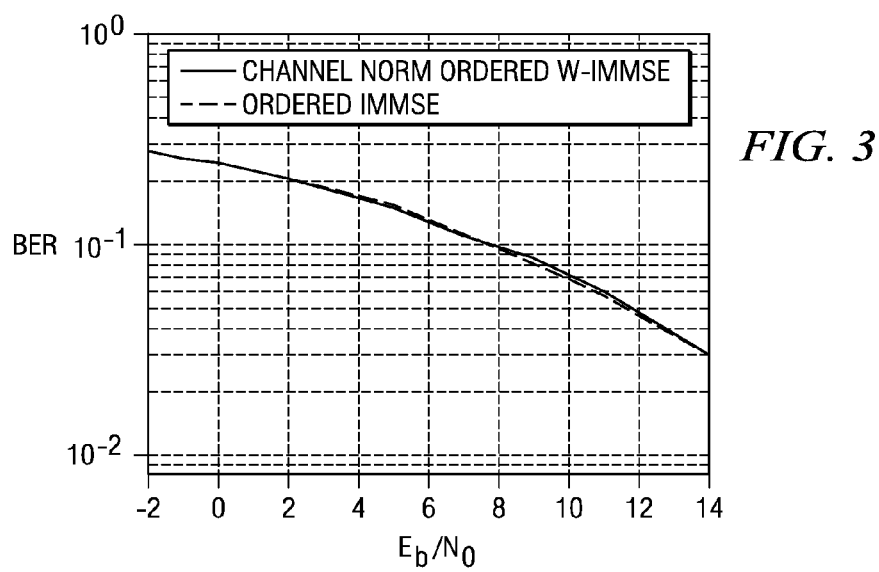
FIG. 3 is a graph depicting simulation results illustrating a comparison of the decoder shown in FIG. 1 with an ordered IMMSE for a 2×2 system using 64-QAM.

The algorithm 100 was simulated for a system with 2 inputs and 2 outputs experiencing MIMO Rayleigh fading using quadrature amplitude modulation (QAM) for various constellation sizes. In MIMO Rayleigh fading, the channel matrix H is a random matrix where all the entries of H are independent, identically distributed complex Gaussian random variables. Simulations shown in FIG. 2 and FIG. 3 show that the raw (or uncoded) average probability of bit error of the algorithm 100 compares favorably with ordered IMMSE decoding. In fact, for 16-QAM 200, algorithm 100 can be seen to outperform ordered IMMSE decoding.

In summary explanation of the above, a column norm-based ordered, whitened decoding algorithm 100 is provided for MIMO communications systems. The decoding algorithm 100 has been shown to perform approximately the same as ordered iterative minimum mean squared error decoding while incurring less computational complexity. The decoding algorithm 100 as well does not color the noise between symbol decisions when decoding a symbol vector.

In view of the above, it can be seen the present invention presents a significant advancement in the art of multiple-input multiple-output (MIMO) communication systems.

Further, this invention has been described in considerable detail in order to provide those skilled in the decoding art with the information needed to apply the novel principles and to construct and use such specialized components as are required.

Further, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, the although the inventive embodiments described herein before were described in association with a 2×2 system, the invention is not so limited, and can just as easily be applied to any Mt×Mr system.

What is claimed is:

1. A method of decoding a signal vector, the method comprising the steps of:
   receiving a signal vector $y_k$;
   multiplying the received signal vector $y_k$ by a conjugate transpose of a channel matrix H* and generating a column vector $z_k$ therefrom;
   reordering entries in the column vector $z_k$ and generating an estimated channel matrix $\tilde{H}$ therefrom;
   decomposing the estimated channel matrix $\tilde{H}$ via Cholesky decomposition and generating a triangular matrix L therefrom;
   solving the triangular matrix L backwards and estimating a signal vector $\tilde{s}_k$ therefrom; and
   sorting the signal vector $\tilde{s}_k$ and generating an estimate of a transmitted symbol vector $\hat{s}_k$ therefrom.

2. The method according to claim 1, wherein the received signal vector $y_k$ is represented by a relationship $y_k = Hs_k + v$ and the column vector $z_k$ is represented by a relationship $z_k = H^*Hs_k + H^*v$, wherein H is a matrix of complex numbers, $s_k$ is a multidimensional symbol vector transmitted at time k, v is a multidimensional vector of additive noise+interference, and $Hs_k$ is a matrix product of H and s.

3. The method according to claim 2, wherein the multidimensional vector of additive noise+interference v, is represented by a relationship $L^{*-1}(\tilde{H}^*v-\sigma^2 I_{M_t}\tilde{s}_k)$, and further wherein v has a zero mean value with a covariance matrix defined as $\sigma^2 I_{M_t}$ under the assumption that associated communication system transmitters transmit each point in an associated communication system constellation with equal probability.

* * * * *